United States Patent
Ebato et al.

(10) Patent No.: US 12,378,454 B2
(45) Date of Patent: Aug. 5, 2025

(54) ADHESIVE, LAMINATE, AND PACKAGING MATERIAL

(71) Applicant: DIC Corporation, Tokyo (JP)

(72) Inventors: Hiroshi Ebato, Tokyo (JP); Yutaka Hamasuna, Tokyo (JP); Takashi Mihara, Chiba (JP)

(73) Assignee: DIC Corporation, Tokyo (JP)

( * ) Notice: Subject to any disclaimer, the term of this patent is extended or adjusted under 35 U.S.C. 154(b) by 221 days.

(21) Appl. No.: 18/009,309

(22) PCT Filed: Jun. 3, 2021

(86) PCT No.: PCT/JP2021/021117
§ 371 (c)(1),
(2) Date: Dec. 8, 2022

(87) PCT Pub. No.: WO2021/256269
PCT Pub. Date: Dec. 23, 2021

(65) Prior Publication Data
US 2023/0257638 A1      Aug. 17, 2023

(30) Foreign Application Priority Data
Jun. 16, 2020   (JP) .............................. 2020-103643

(51) Int. Cl.
| | | |
|---|---|---|
| *C09J 175/06* | (2006.01) | |
| *B32B 7/12* | (2006.01) | |
| *B32B 15/088* | (2006.01) | |
| *B32B 15/20* | (2006.01) | |
| *B32B 27/34* | (2006.01) | |
| *C08G 18/10* | (2006.01) | |
| *C08G 18/42* | (2006.01) | |
| *C08G 18/75* | (2006.01) | |

(52) U.S. Cl.
CPC .............. *C09J 175/06* (2013.01); *B32B 7/12* (2013.01); *B32B 15/088* (2013.01); *B32B 15/20* (2013.01); *B32B 27/34* (2013.01); *C08G 18/10* (2013.01); *C08G 18/4219* (2013.01); *C08G 18/755* (2013.01); *B32B 2250/03* (2013.01); *B32B 2255/26* (2013.01); *B32B 2439/46* (2013.01); *B32B 2439/70* (2013.01); *C08G 2170/00* (2013.01)

(58) Field of Classification Search
CPC ........ C09J 175/06; B32B 7/12; B32B 15/088; B32B 15/20; B32B 27/34; B32B 37/12; B32B 37/182; B32B 2037/1253; B32B 2250/03; B32B 2311/24; B32B 2377/00; B32B 2439/40; B32B 2439/70; B32B 2307/748; B32B 2255/10; B32B 27/08; B32B 27/36; B32B 2307/7242; B32B 2553/00; B32B 2255/06; B32B 2255/26; B32B 2307/306; B32B 2439/46; C08G 18/8029; C08G 18/10; C08G 18/4219; C08G 18/73; C08G 18/755; C08G 18/7621; C08G 18/7671; B65D 65/40
See application file for complete search history.

(56) References Cited

U.S. PATENT DOCUMENTS

| | | |
|---|---|---|
| 2015/0210807 A1 | 7/2015 | Smits et al. |
| 2017/0002134 A1 | 1/2017 | Smits et al. |

FOREIGN PATENT DOCUMENTS

| | | |
|---|---|---|
| CN | 105849151 | 8/2016 |
| JP | 09324027 A * | 12/1997 |
| JP | 2014101422 | 6/2014 |
| JP | 2016540057 | 12/2016 |
| JP | 2017501281 | 1/2017 |

OTHER PUBLICATIONS

"International Search Report (Form PCT/ISA/210) of PCT/JP2021/021117," mailed on Sep. 7, 2021, with English translation thereof, pp. 1-6.

* cited by examiner

*Primary Examiner* — John D Freeman
(74) *Attorney, Agent, or Firm* — JCIPRNET

(57) ABSTRACT

Provided are a laminating adhesive, a laminate, and a packaging material which are excellent in retorting resistance and content resistance. The adhesive includes a polyol composition (A) including a polyester polyol (A1), and a polyisocyanate composition (B) including a polyisocyanate compound (B1), in which the polyester polyol (A1) is a reaction product of a composition including a polycarboxylic acid and a polyhydric alcohol, the polycarboxylic acid including a tetramer acid. The laminate and the packaging material are produced using the adhesive.

11 Claims, No Drawings

ADHESIVE, LAMINATE, AND PACKAGING MATERIAL

CROSS-REFERENCE TO RELATED APPLICATION

This application is a 371 application of the International PCT application serial no. PCT/JP2021/021117, filed on Jun. 3, 2021, which claims the priority benefits of Japan Patent Application No. 2020-103643, filed on Jun. 16, 2020. The entirety of each of the above-mentioned patent applications is hereby incorporated by reference herein and made a part of this specification.

TECHNICAL FIELD

The present invention relates to an adhesive, and a laminate and a packaging material which are obtained using the adhesive.

BACKGROUND ART

As packaging materials for foods, pharmaceuticals, cosmetics, commodities, and the like, composite materials produced by laminating multiple layers of a metal foil such as an aluminum foil or a metal deposition film and a plastic film such as polyethylene, polypropylene, vinyl chloride, polyester, or nylon have been used. These laminates are obtained by appropriately combining various plastic films, metal deposition films, or metal foils depending on required properties for each use application and bonding these films with an adhesive. As the adhesive, a two-component curable adhesive formed from a polyol composition and a polyisocyanate composition is generally used (for example, PTL 1).

The adhesive is also appropriately selected depending on contents and the like. For example, in use application for foods, in order to protect contents from various types of distribution, storage such as refrigeration, treatments such as heat sterilization, and the like, an adhesive having functions such as bag breakage strength, cold resistance, retorting resistance, and heat resistance when used for a packaging material is selected. In use application for commodities such as cleansers, shampoo, and bath additives, an adhesive excellent in resistance to low-molecular-weight compounds such as fragrances and surfactants contained in contents is used.

CITATION LIST

Patent Literature

PTL 1: JP2014-101422A

SUMMARY OF INVENTION

Technical Problem

The demanding standard for these properties with respect to the adhesive is increasingly improved. For example, in the field of food packaging, the movement of sterilization efficiency improvement of foods is increasing along with the changes of the times, that is, improvement in dietary habits, and opportunities of performing a hot water spray type retort treatment is increased instead of a conventional hot water retaining type retort treatment. In the hot water spray type retort treatment, since high-temperature and high-pressure hot water spray is in direct contact with the laminate in some cases, the adhesive is required to have retorting resistance at a level higher than the conventional level.

Furthermore, also in commodities, recently, along with a change in tastes of consumers, strong-smelling products, that is, products having a larger content of fragrance than ever before are increasing, and an adhesive more excellent in content resistance is required.

The invention has been made in view of such circumstances, and an object thereof is to provide a laminating adhesive excellent in retorting resistance and content resistance.

Solution to Problem

The present inventors have found that the above problems can be solved by an adhesive including: a polyol composition (A) including a polyester polyol (A1); and a polyisocyanate composition (B) including a polyisocyanate compound (B1), in which the polyester polyol (A1) is a reaction product of a composition including a polycarboxylic acid and a polyhydric alcohol, the polycarboxylic acid including a tetramer acid.

That is, the invention relates to an adhesive including: a polyol composition (A) including a polyester polyol (A1); and a polyisocyanate composition (B) including a polyisocyanate compound (B1), in which the polyester polyol (A1) is a reaction product of a composition including a polycarboxylic acid and a polyhydric alcohol, the polycarboxylic acid including a tetramer acid.

Advantageous Effects of Invention

According to the adhesive of the invention, it is possible to provide an adhesive, a laminate, and a packaging material which are excellent in retorting resistance and content resistance.

DESCRIPTION OF EMBODIMENTS

\<Adhesive\>

An adhesive of the invention includes: a polyol composition (A) including a polyester polyol (A1); and a polyisocyanate composition (B) including a polyisocyanate compound (B1), in which the polyester polyol (A1) is a reaction product of a monomer composition including a polycarboxylic acid and a polyhydric alcohol, the polycarboxylic acid including a tetramer acid. Hereinafter, the adhesive of the invention will be specifically described.

(Polyol Composition (A))

The polyol composition (A) used for the adhesive of the invention includes the polyester polyol (A1). The polyester polyol (A1) is a reaction product of a monomer composition including a polycarboxylic acid and a polyhydric alcohol, and the polycarboxylic acid includes a tetramer acid as an essential component.

The tetramer acid is a product by Diels-Alder reaction of unsaturated fatty acids including oleic acid and linoleic acid, and is a tetrafunctional carboxylic acid obtained by reacting unsaturated fatty acids contained in recovered oil including a linseed oil fatty acid, a tall oil fatty acid, a soybean oil fatty acid, a rice bran oil fatty acid, a rapeseed oil fatty acid, a sunflower oil fatty acid, and natural oil of these fatty acids. The tetramer acid may be any of non-cyclic, monocyclic, polycyclic, and aromatic cyclic types, and any two or more kinds thereof may be combined.

The reason why the adhesive of the invention is excellent in heat resistance and content resistance is speculated as follows. The carboxyl group of the tetramer acid is bonded directly to the saturated alkyl group, and is less likely to be affected by steric hindrance since the distance between the branch point and the reaction point (carboxyl group) is also long. Along with the fact that the adhesive becomes a liquid at a relatively low temperature, the carboxyl group of the tetramer acid has high reactivity and is preferentially consumed at an early stage of esterification reaction. Therefore, the polyester polyol (A1) using the tetramer acid as a raw material includes a polyester polyol (a1) having a star-type branch structure having the tetramer acid as the center. When the polyol composition (A) including such a polyester polyol (A1) is used, a cured coating film of the adhesive includes a large number of branch points derived from the polyester polyol (a1) and has a high branch point concentration. The branch point derived from the polyester polyol (a1) is less likely to undergo decomposition reaction even in a high-temperature environment or even in the presence of moisture or a low-molecular-weight migrant. Therefore, even in a high-temperature environment or even when a component derived from a content migrates, the branch structure can be maintained and a decrease in adhesive strength can be suppressed. That is, an adhesive excellent in heat resistance, retorting resistance, and content resistance can be obtained.

Further, since the branch point and the reaction point of the tetramer acid are distant from each other as described above, in the polyester polyol (a1), ester binding is not localized near the branch point derived from the tetramer acid. Therefore, the flexibility can be maintained even when the branch point concentration of the cured coating film is high, and not only adhesion between films is excellent, but also adhesiveness between a relatively hard layer such as an aluminum foil, an aluminum deposition layer, or an inorganic oxide deposition layer and a relatively soft layer such as a resin film is excellent. The adhesive layer can also be expected to serve as a buffer that prevents cracks from being formed in an aluminum deposition layer, an inorganic oxide deposition layer, or the like or prevents peeling-off. Even when moisture penetrates the cured coating film, since the molecular chain is not cleaved at a time near the branch point, an adhesive having favorable hot water resistance can be obtained.

Examples of the polycarboxylic acid other than the tetramer acid used for preparation of the polyester polyol (A1) include aliphatic polycarboxylic acids such as malonic acid, ethylmalonic acid, dimethylmalonic acid, succinic acid, 2,2-dimethylsuccinic acid, succinic anhydride, alkenylsuccinic anhydride, glutaric acid, adipic acid, pimelic acid, suberic acid, azelaic acid, sebacic acid, fumaric acid, maleic acid, maleic anhydride, itaconic acid, a dimer acid, and a trimer acid;

alkyl esterified products of aliphatic polycarboxylic acids such as dimethyl malonate, diethyl malonate, dimethyl succinate, dimethyl glutarate, dimethyl adipate, diethyl pimelate, diethyl sebacate, dimethyl fumarate, diethyl fumarate, dimethyl maleate, and diethyl maleate;

alicyclic polycarboxylic acids such as 1,1-cyclopentanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, tetrahydrophthalic anhydride, 4-methyl-hexahydrophthalic anhydride, hexahydrophthalic anhydride, cyclohexane-1,2,4-tricarboxylic-1,2-anhydride, himic anhydride, and het anhydride;

aromatic polycarboxylic acids such as orthophthalic acid, terephthalic acid, isophthalic acid, phthalic anhydride, 1,4-naphthalenedicarboxylic acid, 2,5-naphthalenedicarboxylic acid, 2,6-naphthalenedicarboxylic acid, 2,3-naphthalenedicarboxylic anhydride, naphthalic acid, trimellitic acid, trimellitic anhydride, pyromellitic acid, pyromellitic anhydride, biphenyldicarboxylic acid, 1,2-bis(phenoxy)ethane-p,p'-dicarboxylic acid, benzophenone tetracarboxylic acid, benzophenone tetracarboxylic dianhydride, 5-sodium sulfoisophthalic acid, tetrachlorophthalic anhydride, and tetrabromophthalic anhydride; and methyl esterified products of aromatic polycarboxylic acids such as dimethyl terephthalate and dimethyl 2,6-naphthalenedicarboxylate, and these can be used singly or in combination of two or more kinds thereof.

The polyhydric alcohol used for preparation of the polyester polyol (A1) may be a diol or a trifunctional or higher functional polyol, and examples of the diol include aliphatic diols such as ethylene glycol, diethylene glycol, propylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl-1,5-pentanediol, neopentyl glycol, 1,6-hexanediol, 1,4-bis(hydroxymethyl)cyclohexane, 2,2,4-trimethyl-1,3-pentanediol, and a dimer diol;

ether glycols such as polyoxyethylene glycol and polyoxypropylene glycol;

modified polyether diols obtained by ring-opening polymerization of the aliphatic diols and various cyclic ether bond-containing compounds such as ethylene oxide, propylene oxide, tetrahydrofuran, ethylglycidyl ether, propylglycidyl ether, butylglycidyl ether, phenylglycidyl ether, and allylglycidyl ether;

lactone-based polyester polyols obtained by polycondensation reaction of the aliphatic diols and various lactones such as lanthanoid and ε-caprolactone;

bisphenols such as bisphenol A and bisphenol F; and alkylene oxide adducts of bisphenols obtained by adding ethylene oxide, propylene oxide, and the like to bisphenols such as bisphenol A and bisphenol F.

Examples of the trifunctional or higher functional polyol include aliphatic polyols such as trimethylol ethane, trimethylolpropane, glycerin, hexanetriol, and pentaerythritol;

modified polyether polyols obtained by ring-opening polymerization of the aliphatic polyols and various cyclic ether bond-containing compounds such as ethylene oxide, propylene oxide, tetrahydrofuran, ethylglycidyl ether, propylglycidyl ether, butylglycidyl ether, phenylglycidyl ether, and allylglycidyl ether; and lactone-based polyester polyols obtained by polycondensation reaction of the aliphatic diols and various lactones such as ε-caprolactone.

When the monomer composition includes a compound (b) having a shortest methylene chain having 6 or more and 20 or less carbon atoms between functional groups, more specifically, an aliphatic polycarboxylic acid (b1) having a plurality of carboxyl groups and having a shortest methylene chain having 6 or more and 20 or less carbon atoms between carboxyl groups, or an aliphatic polyhydric alcohol (b2) having a plurality of hydroxyl groups and having a shortest methylene chain having 6 or more and 20 or less carbon atoms between hydroxyl groups, a cured coating film of the adhesive becomes more flexible and adhesiveness to an aluminum deposition layer or an inorganic oxide layer is further excellent, which is preferable. The blending amount of such a compound (b) is appropriately adjusted depending on a function required for the adhesive or other monomers, and is, for example, 0.1 to 35% by mass of the monomer composition. Examples of such a polycarboxylic acid (b1)

and a polyhydric alcohol (b2) include castor oil, a dimer diol, suberic acid, azelaic acid, sebacic acid, a dimer acid, and a trimer acid. Of them, a dimer acid is preferable. Note that, the carbon atoms of the carboxyl group are not included in the number of carbon atoms of the methylene chain. Furthermore, in the case of having an alicyclic structure or an aromatic ring, in addition to the methylene chain, between two functional groups (for example, a dimer acid), carbon atoms forming these ring structures are not included in the methylene chain. When the polycarboxylic acid (b1) or the polyhydric alcohol (b2) has three or more functional groups, the number of carbon atoms of the shortest methylene chain between the functional groups is employed.

As the polycarboxylic acid other than the tetramer acid and the polyhydric alcohol used for preparation of the polyester polyol (A1), pyromellitic acid, pyromellitic anhydride, sorbitol, pentaerythritol, dipentaerythritol, and the like are also preferably used. These monomers can increase the branch point concentration of a cured coating film of the adhesive similarly to the tetramer acid. On the other hand, since these monomers have a short distance between the branch point and the reaction point, and ester binding is concentrated near the branch point, the flexibility of a cured coating film tends to decrease unlike the case of using the tetramer acid. Therefore, it is preferable to use the polycarboxylic acid (b1) or the polyhydric alcohol (b2) which have a methylene chain having 6 or more and 20 or less carbon atoms between the functional groups described above in combination with these monomers. There is a concern that the polyester polyol (A1) is colored in the case of using sorbitol, and in the case of use application in which the appearance is important, it is preferable to use one appropriately selected from pyromellitic acid, pyromellitic anhydride, a dimer acid, pentaerythritol, and dipentaerythritol.

The polyester polyol (A1) may be a polyester polyurethane polyol (A1') including a polyisocyanate as an essential raw material, in addition to the polycarboxylic acid and the polyhydric alcohol described above. Alternatively, the polyester polyol (A1) may be a mixture of the polyester polyol (A1) and the polyester polyurethane polyol (A1'). As the polyisocyanate used for preparation of the polyester polyurethane polyol (A1'), the same compounds as exemplified as the polyisocyanate compound (B1) described below can be used singly or in combination of a plurality of kinds thereof.

The polyester polyurethane polyol (A1') may be one obtained by synthesizing a polyester polyol as a precursor and then performing urethane extension, or may be one obtained by simultaneously reacting monomer compositions including a polycarboxylic acid, a polyhydric alcohol, and a polyisocyanate.

The blending amount of the tetramer acid is not particularly limited, but for example, when the blending amount thereof in the total amount of the monomer compositions used in synthesis of the polyester polyol (A1) is 0.1% by mass or more, heat resistance and content resistance are easily improved, which is preferable. The upper limit is not particularly limited, but is set to preferably 4.0% by mass or less of the total amount of the monomer compositions from the viewpoint that, when the blending amount is too large, gelation is likely to occur at the time of producing the polyester polyol (A1) to increase difficulty in production. The blending amount is more preferably 0.1% by mass or more and 2.0% by mass or less. Note that, when the polyester polyol (A1) is the polyester polyurethane polyol (A1'), the monomer compositions include a polycarboxylic acid, a polyhydric alcohol, and a polyisocyanate used in synthesis of the polyester polyurethane polyol (A1').

The number average molecular weight (Mn) of the polyester polyol (A1) is not particularly limited, and is, for example, 500 to 100,000 and more preferably 1,000 to 50,000. Furthermore, the weight average molecular weight (Mw) is, for example, 1,000 to 300,000 and more preferably 2,000 to 200,000. Note that, the number average molecular weight (Mn) and the weight average molecular weight (Mw) in the present specification are values measured by gel permeation chromatography (GPC) under the conditions.

Measuring device: HLC-8320GPC manufactured by Tosoh Corporation

Column: TSKgel 4000HXL, TSKgel 3000HXL, TSKgel 2000HXL, and TSKgel 1000HXL manufactured by Tosoh Corporation Detector: RI (differential refractometer)

Data processing: Multistation GPC-8020 model II manufactured by Tosoh Corporation Measurement conditions: column temperature 40° C.

solvent Tetrahydrofuran flow rate 0.35 ml/min

Standard: Monodisperse polystyrene

Sample: A sample obtained by filtering a 0.2% by mass tetrahydrofuran solution in terms of resin solid content with a microfilter (100 µl)

The hydroxyl value of the polyester polyol (A1) is preferably in a range of 1 to 150 mgKOH/g, and more preferably 3 mgKOH/g or more and 100 mgKOH/g or less. Furthermore, the acid value of the polyester polyol (A1) is not particularly limited, and is preferably 10.0 mgKOH/g or less. The lower limit is not particularly limited, and is, for example, 0.5 mgKOH/g or more. The lower limit may be 0 mgKOH/g. The hydroxyl value and the acid value can be measured by the methods described in JIS-K 0070.

The polyol composition (A) may include a polyol (A2) other than the polyester polyol (A1). Examples of the polyol (A2) include those exemplified as the polyhydric alcohol used for preparation of the polyester polyol (A1). When the polyol composition (A) includes the polyol (A2), the blending amount of the polyester polyol (A1) is preferably 70 parts by mass or more, more preferably 80 parts by mass or more, and more preferably 90 parts by mass or more, with respect to 100 parts by mass of the total blending amount of the polyester polyol (A1) and the polyol (A2).

(Polyisocyanate Composition (B))

The polyisocyanate composition (B) includes the polyisocyanate compound (B1). The polyisocyanate compound (B1) is not particularly limited, and known polyisocyanate compounds can be used. Examples of such a polyisocyanate compound (B1) include polyisocyanates having an aromatic structure in the molecular structure such as tolylene diisocyanate, diphenylmethane diisocyanate, polymeric diphenylmethane diisocyanate, 1,5-naphthalene diisocyanate, triphenylmethane triisocyanate, and xylylene diisocyanate, and compounds in which a part of NCO group of these polyisocyanates is modified with carbodiimide;

polyisocyanates having an alicyclic structure in the molecular structure such as isophorone diisocyanate, 4,4'-methylenebis(cyclohexyl isocyanate), and 1,3-(isocyanatomethyl)cyclohexane;

linear aliphatic polyisocyanates such as 1,6-hexamethylene diisocyanate, 1,5-pentamethylene diisocyanate, lysine diisocyanate, and trimethylhexamethylene diisocyanate, and compounds in which a part of NCO group of these polyisocyanates is modified with carbodiimide;

isocyanurate forms of these polyisocyanates; allophanate forms of these polyisocyanates; biuret forms of these polyisocyanates; adduct forms obtained by modifying these polyisocyanates with trimethylolpropane; and polyurethane polyisocyanates which are reaction products of these polyisocyanates and a polyol.

When a polyurethane polyisocyanate is used as the polyisocyanate compound (B1), from the viewpoint of a balance between cohesion and flexibility of an adhesive coating film, the polyurethane polyisocyanate is preferably obtained by reacting the polyisocyanate and the polyol described above at a ratio of an equivalent ratio [NCO]/[OH] of an isocyanate group to a hydroxyl group of 1.5 to 5.0.

Examples of the polyol used for preparation of the polyurethane polyisocyanate include linear aliphatic glycols such as ethylene glycol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutanediol, butylethylpropanediol, diethylene glycol, triethylene glycol, tetraethylene glycol, dipropylene glycol, tripropylene glycol, and bishydroxyethoxybenzene;

alicyclic glycols such as 1,4-cyclohexanediol and 1,4-cyclohexanedimethanol;

trifunctional or tetrafunctional aliphatic alcohols such as glycerin, trimethylolpropane, and pentaerythritol;

bisphenols such as bisphenol A, bisphenol F, hydrogenated bisphenol A, and hydrogenated bisphenol F;

dimer diols;

polyether polyols obtained by addition-polymerizing an alkylene oxide, such as ethylene oxide, propylene oxide, butylene oxide, styrene oxide, epichlorohydrin, tetrahydrofuran, or cyclohexylene, in the presence of polymerization initiator such as the glycol or the trifunctional or tetrafunctional aliphatic alcohol;

a polyester polyol (1) which is a reaction product of a polyester obtained by ring-opening polymerization reaction of a cyclic ester compound such as propiolactone, butyrolactone, ε-caprolactone, σ-valerolactone, or β-methyl-σ-valerolactone, and the glycol or the trifunctional or tetrafunctional aliphatic alcohol;

a polyester polyol (2) obtained by reacting a polyol such as the linear aliphatic glycol, the alicyclic glycol, the dimer diol, the bisphenol, or the polyether polyol, and a polycarboxylic acid;

a polyester polyol (3) obtained by reacting the trifunctional or tetrafunctional aliphatic alcohol and a polycarboxylic acid;

a polyester polyol (4) obtained by reacting a difunctional polyol, the trifunctional or tetrafunctional aliphatic alcohol, and a polycarboxylic acid;

a polyester polyol (5) which is a polymer of hydroxyl acid such as dimethylol propionic acid or castor oil fatty acid;

a mixture of the polyester polyol (1), (2), (3), (4), or (5) and a polyether polyol; and castor oil-based polyols such as castor oil, hydrogenated castor oil which is a hydrogenated product of castor oil, and alkylene oxide 5 to 50 mole adducts of castor oil, and these can be used singly or in combination of a plurality of kinds thereof.

Furthermore, as the polycarboxylic acid used for preparation of the polyester polyols (2) to (5), the same polycarboxylic acid as that used for preparation of the polyester polyol (A1) described above can be used.

The polyisocyanate compound (B1) is preferably an isocyanurate form, allophanate form, biuret form, or adduct form of any of polyisocyanates having an aromatic structure in the molecular structure, compounds in which a part of NCO group of polyisocyanates having an aromatic structure in the molecular structure is modified with carbodiimide, and polyisocyanates having an alicyclic structure in the molecular structure, and is preferably an isocyanurate form, allophanate form, biuret form, or adduct form of any of tolylene diisocyanate, 1,6-hexamethylene diisocyanate, xylylene diisocyanate, and isophorone diisocyanate.

(Other Components of Adhesive)

The adhesive of the invention may include components other than the above-described components. These components may be included in any one or both of the polyol composition (A) and the polyisocyanate composition (B), or may be prepared separately from the polyol composition (A) and the polyisocyanate composition (B) and mixed with the polyol composition (A) and the polyisocyanate composition (B) immediately before applying the adhesive. Each component will be described below.

(Organic Solvent)

The adhesive of the invention may be in any form of a solvent type or a solvent-free type. A "solvent-type" adhesive described in the invention refers to the form used in a method, a so-called dry lamination method, in which the adhesive is applied to a base material and then heated with an oven or the like to volatilize an organic solvent in the coating film, and then the base material is bonded to another base material. Any one or both of the polyol composition (A) and the polyisocyanate composition (B) include an organic solvent capable of dissolving (diluting) constituents of the polyol composition (A) and the polyisocyanate composition (B) used in the invention.

Examples of the organic solvent include esters such as ethyl acetate, butyl acetate, and cellosolve acetate; ketones such as acetone, methyl ethyl ketone, isobutyl ketone, and cyclohexanone; ethers such as tetrahydrofuran and dioxane; aromatic hydrocarbons such as toluene and xylene; halogenated hydrocarbons such as methylene chloride and ethylene chloride; dimethyl sulfoxide; and dimethyl sulfonamide. The organic solvent used as a reaction medium at the time of production of constituents of the polyol composition (A) or the polyisocyanate composition (B) may be further used as a diluent during coating in some cases.

A "solvent-free type" adhesive in the present specification refers to the form of the adhesive used in a method, a so-called non-solvent lamination method, in which the polyol composition (A) and the polyisocyanate composition (B) do not substantially include an organic solvent having high solubility as described above, particularly, ethyl acetate or methyl ethyl ketone, the adhesive is applied to a base material, and then the base material is bonded to another base material without performing a step of volatilizing an organic solvent by heating with an oven or the like. When an organic solvent used as a reaction medium at the time of production of constituents or raw materials of the polyol composition (A) or the polyisocyanate composition (B) is not completely removed and a trace amount of the organic solvent remains in the polyol composition (A) or the polyisocyanate composition (B), it is speculated that the organic solvent is not substantially included. Furthermore, when the polyol composition (A) includes a low-molecular-weight alcohol, the low-molecular-weight alcohol reacts with the polyisocyanate composition (B) to form a part of a coating film, and thus it is not necessary to volatilize the low-molecular-weight alcohol after coating. Therefore, such a form is also regarded as a solvent-free type adhesive, and the low-molecular-weight alcohol is not regarded as an organic solvent.

(Catalyst)

The adhesive of the invention can promote curing reaction by using a catalyst as necessary. The catalyst is not particularly limited as long as it promotes the urethane formation reaction of the polyol composition (A) and the polyisocyanate composition (B), and examples thereof include metal-based catalysts, amine-based catalysts, aliphatic cyclic amide compounds, and titanium chelate complexes.

Examples of the metal-based catalysts include metal complex-based, inorganic metal-based, and organic metal-based catalysts. Examples of the metal complex-based catalyst include an acetylacetonate salt of a metal selected from the group consisting of Fe (iron), Mn (manganese), Cu (copper), Zr (zirconium), Th (thorium), Ti (titanium), Al (aluminum), and Co (cobalt), for example, iron acetylacetonate, manganese acetylacetonate, copper acetylacetonate, and zirconium acetylacetonate. From the viewpoint of toxicity and catalyst activity, iron acetylacetonate (Fe(acac)$_3$) or manganese acetylacetonate (Mn(acac)$_2$) is preferable.

Examples of the inorganic metal-based catalysts include those selected from Sn, Fe, Mn, Cu, Zr, Th, Ti, Al, Co, and the like.

Examples of the organic metal-based catalysts include organic zinc compounds such as zinc octylate, zinc neodecanoate, and zinc naphthenate; organic tin compounds such as stannous diacetate, stannous dioctoate, stannous dioleate, stannous dilaurate, dibutyltin diacetate, dibutyltin dilaurate, dioctyltin dilaurate, dibutyltin oxide, and dibutyltin dichloride; organic nickel compounds such as nickel octylate and nickel naphthenate; organic cobalt compounds such as cobalt octylate and cobalt naphthenate; organic bismuth compounds such as bismuth octylate, bismuth neodecanoate, and bismuth naphthenate; and titanium-based compounds such as tetraisopropyloxy titanate, dibutyltitanium dichloride, tetrabutyl titanate, and butoxytitanium trichloride.

Examples of the amine-based catalysts include triethylenediamine, 2-methyltriethylenediamine, quinuclidine, 2-methylquinuclidine, N,N,N',N'-tetramethylethylenediamine, N,N,N',N'-tetramethylpropylene diamine, N,N,N',N'',N''-pentamethyldiethylenetriamine, N,N,N',N'',N''-pentamethyl-(3-aminopropyl)ethylenediamine, N,N,N',N'',N''-pentamethyl dipropylene triamine, N,N,N',N'-tetramethyl hexamethylene diamine, bis(2-dimethylaminoethyl)ether, dimethylethanolamine, dimethylisopropanolamine, dimethylaminoethoxy ethanol, N,N-dimethyl-N'-(2-hydroxyethyl)ethylenediamine, N,N-dimethyl-N'-(2-hydroxyethyl)propanediamine, bis(dimethylaminopropyl)amine, bis(dimethylaminopropyl)isopropanolamine, 3-quinuclidinol, N,N,N',N'-tetramethylguanidine, 1,3,5-tris(N,N-dimethylaminopropyl)hexahydro-S-triazine, 1,8-diazabicyclo[5.4.0]undecene-7, N-methyl-N'-(2-dimethylaminoethyl)piperazine, N,N'-dimethylpiperazine, dimethylcyclohexylamine, N-methylmorpholine, N-ethylmorpholine, 1-methylimidazole, 1,2-dimethylimidazole, 1-isobutyl-2-methylimidazole, 1-dimethylaminopropylimidazole, N,N-dimethylhexanol amine, N-methyl-N'-(2-hydroxyethyl)piperazine, 1-(2-hydroxyethyl)imidazole, 1-(2-hydroxypropyl)imidazole, 1-(2-hydroxyethyl)-2-methylimidazole, and 1-(2-hydroxypropyl)-2-methylimidazole.

Examples of the aliphatic cyclic amide compounds include δ-valerolactam, ε-caprolactam, ω-enantholactam, η-capryl lactam, and β-propiolactam. Among these, ε-caprolactam is more effective in curing acceleration.

The titanium chelate complex is a compound of which catalyst activity is enhanced by ultraviolet irradiation, and a titanium chelate complex having an aliphatic or aromatic diketone as a ligand is preferable from the viewpoint of an excellent curing acceleration effect. Alternatively, in the invention, in addition to an aromatic or aliphatic diketone, an alcohol having 2 to 10 carbon atoms is included as a ligand, which is preferable from the viewpoint that the effect of the invention is more significant.

These catalysts can be used singly or in combination of two or more kinds thereof. The blending amount of the catalyst is set to preferably 0.001 to 3 parts by mass and more preferably 0.01 to 2 parts by mass, with respect to 100 parts by mass of the total solid content of the polyol composition (A) and the polyisocyanate composition (B).

(Pigment)

The adhesive of the invention may include a pigment as necessary. A pigment to be used is not particularly limited, and examples thereof include organic pigments and inorganic pigments such as extender pigments, white pigments, black pigments, gray pigments, red pigments, brown pigments, green pigments, blue pigments, metal powder pigments, light-emitting pigments, and pearl-colored pigments, and plastic pigments described in Toryo Genryou Binran (Paint material handbook), 1970 edition (edited by Japan Paint Manufacturers Association).

Examples of the extender pigments include precipitated barium sulfate, chalk, precipitated calcium carbonate, calcium bicarbonate, white marble, alumina white, silica, hydrated fine powder silica (white carbon), ultrafine anhydrous silica (aerosil), silica sand, talc, precipitated magnesium carbonate, bentonite, clay, kaolin, and ocher.

Specific examples of the organic pigments include various insoluble azo pigments such as benzidine yellow, hansa yellow, and lake red 4R; soluble azo pigments such as lake red C, carmine 6B, and Bordeaux 10; various (copper) phthalocyanine pigments such as phthalocyanine blue and phthalocyanine green; various chlorine dyed lakes such as rhodamine lake and methyl violet lake; various mordant dye pigments such as quinoline lake and fast sky blue; various vat dye pigments such as anthraquinone pigments, thioindigo pigments, and perinone pigments; various quinacridone pigments such as cinquasia red B; various dioxazine pigments such as dioxazine violet; various condensed azo pigments such as chromophthal; and aniline black.

Examples of the inorganic pigments include various chromates such as chrome yellow, zinc chromate, and molybdate orange; various ferrocyan compounds such as Prussian blue; various metal oxides such as titanium oxide, Chinese white, Mapico yellow, iron oxide, red iron oxide, chromium oxide green, and zirconium oxide; various sulfides and selenides such as cadmium yellow, cadmium red, and mercury sulfide; various sulfates such as barium sulfate and lead sulfate; various silicates such as calcium silicate and ultramarine blue; various carbonates such as calcium carbonate and magnesium carbonate; various phosphates such as cobalt violet and manganese violet; various metal powder pigments such as aluminum powder, gold powder, silver powder, copper powder, bronze powder, and brass powder; flake pigments of these metals and mica flake pigments; metallic pigments and pearl pigments such as mica flake pigments coated with metal oxides and mica-like iron oxide pigments; and graphite and carbon black.

Examples of the plastic pigments include "GRANDOLL PP-1000" and "PP-2000S" manufactured by DIC Corporation.

The pigments to be used may be appropriately selected depending on the purpose, and from the viewpoint of excellent durability, weather resistance, and design properties, inorganic oxides such as titanium oxide and Chinese white are preferably used as white pigments, and carbon black is preferably used as a black pigment.

The blending amount of the pigment is, for example, 1 to 400 parts by mass with respect to 100 parts by mass of the total solid content of the polyol composition (A) and the polyisocyanate composition (B), and is set to more preferably 10 to 300 parts by mass in terms of making adhesiveness and blocking resistance more favorable.

(Adhesion Promoter)

The adhesive of the invention may include an adhesion promoter. Examples of the adhesion promoter include coupling agents such as a silane coupling agent, a titanate-based coupling agent, and an aluminum-based coupling agent, and an epoxy resin.

Examples of the silane coupling agent include aminosilanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyldimethoxysilane, and N-phenyl-γ-aminopropyltrimethoxysilane; epoxy silanes such as β-(3,4-epoxycyclohexyl)ethyltrimethoxysilane, γ-glycidoxypropyltrimethoxysilane, and γ-glycidoxypropyltriethoxysilane; vinyl silanes such as vinyltris(β-methoxyethoxy)silane, vinyltriethoxysilane, vinyltrimethoxysilane, and γ-methacryloxypropyltrimethoxysilane; hexamethyldisilazane, and γ-mercaptopropyltrimethoxysilane.

Examples of the titanate-based coupling agent include tetraisopropoxy titanium, tetra-n-butoxy titanium, butyl titanate dimer, tetrastearyl titanate, titanium acetylacetonate, titanium lactate, tetraoctylene glycol titanate, and tetrastearoxytitanium.

Examples of the aluminum-based coupling agent include acetoalkoxyaluminum diisopropylate.

Examples of the epoxy resin include various epoxy resins such as generally commercially available epi-bis type, novolak type, β-methyl epichlo type, cyclic oxilane type, glycidyl ether type, glycidyl ester type, polyglycol ether type, glycol ether type, epoxidized fatty acid ester type, polycarboxylic acid ester type, aminoglycidyl type, and resorcin type epoxy resins, and compounds such as triglycidyl tris(2-hydroxyethyl)isocyanurate, neopentyl glycol diglycidyl ether, 1,6-hexanediol diglycidyl ether, acryl glycidyl ether, 2-ethylhexyl glycidyl ether, phenyl glycidyl ether, phenol glycidyl ether, p-t-butylphenyl glycidyl ether, diglycidyl adipate, o-diglycidyl phthalate, glycidyl methacrylate, and butyl glycidyl ether.

(Other Additives)

The adhesive of the invention may include, in addition to the above-described components, a leveling agent, inorganic fine particles such as colloidal silica and alumina sol, organic fine particles based on polymethyl methacrylate, a defoaming agent, an antisagging agent, a wetting and dispersing agent, a viscosity adjustor, a UV absorber, a metal deactivating agent, a peroxide decomposer, a flame retardant, a reinforcing agent, a plasticizer, a lubricant, a rust inhibitor, a fluorescent brightener, an inorganic heat ray absorber, a flameproofing agent, an antistatic agent, a dehydrating agent, a known conventional thermoplastic elastomer, a tackifier, a phosphoric acid compound, a melamine resin, a reactive elastomer, and the like. The blending amounts of these additives are appropriately adjusted in a range that desires for the adhesive of the invention are not impaired.

<Laminate>

A laminate of the invention is obtained by bonding a plurality of films or paper using the adhesive of the invention by a dry lamination method or a non-solvent lamination method. There is no particular limitation in films to be used, and a film can be appropriately selected depending on use applications. Examples of films for food packaging include a polyethylene terephthalate (PET) films, a polystyrene film, a polyamide film, a polyacrylonitrile film, a polyolefin film such as a polyethylene film (LLDPE: low-density polyethylene film, HDPE: high-density polyethylene film), and a polypropylene film (CPP: unstretched polypropylene film, OPP: biaxially stretched polypropylene film), a polyvinyl alcohol film, and an ethylene-vinyl alcohol copolymer film.

The film may be subjected to a stretching treatment. As a stretching treatment method, generally, a resin is melt-extruded into a sheet by an extrusion film-forming method or the like and then simultaneous biaxial stretching or sequential biaxial stretching is performed. Furthermore, in the case of the sequential biaxial stretching, generally, a machine direction stretching treatment is first performed and then transversal stretching is performed. Specifically, a method of combining machine direction stretching that utilizes the difference in speed between rolls and transverse direction stretching using a tenter is frequently used.

Alternatively, a film laminated with a deposition layer of a metal such as aluminum or a metal oxide such as silica or alumina, and a barrier film including a gas barrier layer of a polyvinyl alcohol or ethylene-vinyl alcohol copolymer, or vinylidene chloride or the like may be used in combination. By using such a film, a laminate having barrier properties against water vapor, oxygen, alcohol, inert gas, volatile organic materials (fragrance), and the like can be obtained.

More specific examples of the configuration of the laminate include, although not limited to, (1) a base material film 1/an adhesive layer 1/a sealant film, (2) a base material film 1/an adhesive layer 1/a metal deposition unstretched film, (3) a base material film 1/an adhesive layer 1/a metal deposition stretched film, (4) a transparent deposition stretched film/an adhesive layer 1/a sealant film, (5) a base material film 1/an adhesive layer 1/a base material film 2/an adhesive layer 2/a sealant film, (6) a base material film 1/an adhesive layer 1/a metal deposition stretched film/an adhesive layer 2/a sealant film, (7) a base material film 1/an adhesive layer 1/a transparent deposition stretched film/an adhesive layer 2/a sealant film, (8) a base material film 1/an adhesive layer 1/a metal layer/an adhesive layer 2/a sealant film, (9) a base material film 1/an adhesive layer 1/a base material film 2/an adhesive layer 2/a metal layer/an adhesive layer 3/a sealant film, and

(10) a base material film 1/an adhesive layer 1/a metal layer/an adhesive layer 2/a base material film 2/an adhesive layer 3/a sealant film.

Examples of the base material film 1 used in the configuration (1) include an OPP film, a PET film, and a nylon film (hereinafter, also referred to as "Ny film"). Furthermore, as the base material film 1, a film subjected to coating for the purposes such as improvement in gas barrier properties and ink acceptability when a printing layer described below is provided may be used. Examples of commercially available products of the base material film 1 subjected to coating include a K-OPP film and a K-PET film. The adhesive layer 1 is a cured coating film of the adhesive of the invention. Examples of the sealant film include a CPP film and an LLDPE film. A printing layer may be provided on the surface of the base material film 1 on the adhesive layer 1 side (when a film subjected to coating is used as the base material film 1, the surface of a coating layer on the adhesive layer 1 side). The printing layer is formed using various printing inks such as gravure inks, flexographic inks, offset inks, stencil inks, and inkjet inks by a general printing method that has been used in printing to a conventional polymer film.

Examples of the base material film 1 used in the configurations (2) and (3) include an OPP film and a PET film. The adhesive layer 1 is a cured coating film of the adhesive of the invention. A VM-CPP film obtained by subjecting a CPP film to metal deposition of aluminum or the like can be used as the metal deposition unstretched film, and a VM-OPP film obtained by subjecting an OPP film to metal deposition of aluminum or the like can be used as the metal deposition stretched film. A printing layer may be provided on the surface of the base material film 1 on the adhesive layer 1 side in the same manner as in the configuration (1).

Examples of the transparent deposition stretched film used in the configuration (4) include films obtained by subjecting an OPP film, a PET film, a nylon film, and the like to silica or alumina deposition. A film having a deposition layer subjected to coating for the purposes such as protection of an inorganic deposition layer of silica or alumina may be used. The adhesive layer 1 is a cured coating film of the adhesive of the invention. Examples of the sealant film include the same sealant film as that in the configuration (1). A printing layer may be provided on the surface of the transparent deposition stretched film on the adhesive layer 1 side (when a film having an inorganic deposition layer subjected to coating is used, the surface of a coating layer on the adhesive layer 1 side). The method of forming the printing layer is the same as in the configuration (1).

Examples of the base material film 1 used in the configuration (5) include a PET film. Examples of the base material film 2 include a nylon film. At least one of the adhesive layer 1 and the adhesive layer 2 is a cured coating film of the adhesive of the invention. Examples of the sealant film include the same sealant film as that in the configuration (1). A printing layer may be provided on the surface of the base material film 1 on the adhesive layer 1 side in the same manner as in the configuration (1).

Examples of the base material film 1 in the configuration (6) include the same base material film as those in the configurations (2) and (3). Examples of the metal deposition stretched film include a VM-OPP film and a VM-PET film obtained by subjecting an OPP film or a PET film to metal deposition of aluminum or the like. At least one of the adhesive layer 1 and the adhesive layer 2 is a cured coating film of the adhesive of the invention. Examples of the sealant film include the same sealant film as that in the configuration (1). A printing layer may be provided on the surface of the base material film 1 on the adhesive layer 1 side in the same manner as in the configuration (1).

Examples of the base material film 1 in the configuration (7) include a PET film. Examples of the transparent deposition stretched film include the same transparent deposition stretched film as that in the configuration (4). At least one of the adhesive layer 1 and the adhesive layer 2 is a cured coating film of the adhesive of the invention. Examples of the sealant film include the same sealant film as that in the configuration (1). A printing layer may be provided on the surface of the base material film 1 on the adhesive layer 1 side in the same manner as in the configuration (1).

Examples of the base material film 1 in the configuration (8) include a PET film. Examples of the metal layer include an aluminum foil. At least one of the adhesive layers 1 and 2 is a cured coating film of the adhesive of the invention. Examples of the sealant film include the same sealant film as that in the configuration (1). A printing layer may be provided on the surface of the base material film 1 on the adhesive layer 1 side in the same manner as in the configuration (1).

Examples of the base material film 1 in the configurations (9) and (10) include a PET film. Examples of the base material film 2 include a nylon film. Examples of the metal layer include an aluminum foil. At least one layer of the adhesive layers 1, 2, and 3 is a cured coating film of the adhesive of the invention. Examples of the sealant film include the same sealant film as that in the configuration (1). A printing layer may be provided on the surface of the base material film 1 on the adhesive layer 1 side in the same manner as in the configuration (1).

When the laminate of the invention includes at least one of a metal deposition film, a transparent deposition film, and a metal layer, the adhesive layer in contact with the metal deposition layer, the transparent deposition layer, or the metal layer is preferably a cured coating film of the adhesive of the invention.

When the adhesive of the invention is a solvent type, the adhesive of the invention is applied to a film material serving as a base material by using a roll such as a gravure roll, an organic solvent is volatilized by heating with an oven or the like, and then another base material is bonded thereto, thereby obtaining the laminate of the invention. After laminating, an aging treatment is preferably performed. The aging temperature is preferably room temperature to 80° C., and the aging time is preferably 12 to 240 hours.

When the adhesive of the invention is a solvent-free type, the adhesive of the invention, which has been heated to about 40° C. to 100° C. in advance, is applied to a film material serving as a base material by using a roll such as a gravure roll, and another base material is immediately bonded thereto, thereby obtaining the laminate of the invention. After laminating, an aging treatment is preferably performed. The aging temperature is preferably room temperature to 70° C., and the aging time is preferably 6 to 240 hours.

When the adhesive of the invention is used as an adhesion aid, the adhesion aid of the invention is applied to a film material serving as a base material by using a roll such as a gravure roll, an organic solvent is volatilized by heating with an oven or the like, and then a polymer material melted by an extruder is laminated, thereby obtaining the laminate of the invention.

The coating amount of the adhesive is appropriately adjusted. In the case of a solvent-type adhesive, the coating amount is adjusted so that the solid content amount is, for example, 1 $g/m^2$ or more and 10 $g/m^2$ or less, and preferably 2 $g/m^2$ or more and 5 $g/m^2$ or less. In the case of a solvent-free type adhesive, the coating amount of the adhesive is, for example, 1 $g/m^2$ or more and 5 $g/m^2$ or less, and preferably 1 $g/m^2$ or more and 3 $g/m^2$ or less.

When the adhesive of the invention is used as an adhesion aid, the coating amount is, for example, 0.1 $g/m^2$ or more and 2 $g/m^2$ or less (solid content).

The laminate of the invention may further include other films or base materials in addition to the above-described configurations (1) to (10). As other base materials, in addition to the stretched film, the unstretched film, and the transparent deposition film described above, porous base materials such as paper, wood, and leather described below can also be used. The adhesive used when the other base materials are bonded may or may not be the adhesive of the invention.

Paper is not particularly limited, and a known paper base material can be used. Specifically, the paper base material is produced using natural fibers for papermaking such as wood pulp by a known paper machine, but papermaking conditions thereof are not particularly limited. Examples of the natural fibers for papermaking include wood pulp such as softwood pulp and hardwood pulp, non-wood pulp such as Manila hemp pulp, sisal hemp pulp, and flax pulp, and pulp obtained by chemically modifying these pulps. As the type of pulp, chemical pulp obtained by a sulfate pulping method, an acidic/neutral/alkaline sulfite pulping method, a soda salt pulping method, or the like, ground pulp, chemiground pulp, thermomechanical pulp, and the like can be used.

Furthermore, various commercially available high-quality paper, coated paper, backing paper, impregnated paper, cardboard, paper board, and the like can also be used. Furthermore, a printing layer may be provided on the outer surface or inner surface of the paper layer, as necessary.

The "other layers" may include known additives and stabilizers, such as an antistatic agent, an easily adhesive coating agent, a plasticizer, a lubricant, and an antioxidant. Furthermore, the "other layers" may also be films whose surfaces are subjected to pretreatments such as a corona treatment, a plasma treatment, an ozone treatment, a chemical treatment, and a solvent treatment, for the purpose of improving the adhesiveness in the lamination with the other materials.

The laminate of the invention can be suitably used for various use applications, for example, as packaging materials for foods, drugs, and housewares, lid materials, paper food containers such as paper straws, paper napkins, paper spoons, paper dishes, and paper cups, exterior industrial applications such as protective wall materials, roof materials, solar panel materials, battery packaging materials, window materials, exterior flooring materials, lighting protection materials, automobile members, signboards, and stickers, decorative sheets used in an injection molding simultaneous decorating method or the like, packaging materials for laundry liquid detergents, dish liquid detergents, bath liquid detergents, bath liquid soaps, liquid shampoo, and liquid conditioner, and the like.

In particular, in the case of performing a retort treatment, in a laminate obtained by bonding an Ny film and an aluminum foil with an adhesive layer interposed therebetween, peeling between these layers is likely to occur. In this regard, by bonding the Ny film and the aluminum foil using the adhesive of the invention, a laminate excellent in retorting resistance can be obtained.

More specific configuration examples include the PET film/the Ny film/the aluminum foil/the CPP film, the PET film/the aluminum foil/the Ny film/the CPP film, and the Ny film/the aluminum foil/the Ny film/the CPP film, and the Ny film and the aluminum foil are bonded using the adhesive of the invention. Other films may be bonded using a general-purpose adhesive or may be bonded using the adhesive of the invention. It is needless to say that a printing layer may be provided at an appropriate position of the laminate.

When the content resistance is necessary and a laminate includes a barrier layer such as an aluminum foil, an aluminum deposition layer, or an inorganic oxide layer, among the adhesive layers provided between the barrier layer and a sealant layer, it is preferable to use the adhesive of the invention in the adhesive layer positioned nearest the barrier layer. Components derived from the content migrating from the sealant side accumulate near the barrier layer, and thus the adhesive layer nearest the barrier layer is affected by the content and is likely to deteriorate. In this regard, by using the adhesive of the invention, deterioration of the adhesive layer caused by the content can be suppressed.

More specific examples of the configuration include the transparent deposition PET film/the adhesive layer obtained by the invention/the Ny film/the sealant film, the PET film/the aluminum foil/the adhesive layer obtained by the invention/the sealant film, and the PET film/the aluminum foil/the adhesive layer obtained by the invention/the PET film/the sealant film. As other configurations, a laminate including the Ny film/the adhesive layer obtained by the invention/the aluminum deposition PET film/the sealant film is also excellent in content resistance, which is preferable. Also in these laminates, the adhesive layers other than the adhesive layer obtained by the invention may be bonded using a general-purpose adhesive or may be bonded using the adhesive of the invention. A printing layer is provided at an appropriate position of the laminate, but the description thereof is omitted. When a stronger strength such as pinking resistance is necessary, a transparent deposition Ny film may be used instead of the aluminum deposition PET film and the transparent deposition PET film.

<Packaging Material>

The laminate of the invention can be used as a multilayer packaging material for protection of foods, drugs, and the like. When the laminate is used as a multilayer packaging material, the layer configuration thereof may change depending on the content, the usage environment, and the usage form. Furthermore, a packaging body of the invention may be appropriately provided with easy-to-unseal treatment or a resealing means.

The packaging material of the invention is obtained in a bag shape by using the laminate of the invention, superimposing sealant film surfaces of laminates to face each other, and then heat-sealing the peripheral edge thereof. As a packaging bag production method, for example, the laminate of the invention is folded or laminates are superimposed such that inner surfaces (sealant film surfaces) face each other, and the peripheral edge thereof is heat-sealed in a mode of, for example, side sealing, two-direction sealing, three-direction sealing, four-direction sealing, envelope-type sealing, pillow-type sealing, gather sealing, flat bottom sealing, square bottom sealing, gazette sealing, and any other type of sealing. The packaging material of the invention may have various forms depending on the contents, the usage environment, and the usage form. The packaging material is also usable for a standing packaging material (standing pouch) or the like. Regarding the heat-sealing method, the heat-sealing can be performed by a known method such as bar sealing, rotary roll sealing, belt sealing, impulse sealing, high frequency sealing, or ultrasonic sealing.

A content is charged into the packaging material of the invention from an opening thereof, and then the opening is heat-sealed to produce a product that uses the packaging material of the invention. The content to be charged includes various foods, for example, confectionery such as rice confectionery, bean confectionery, nuts, biscuits/cookies, wafers, marshmallows, pies, semi-baked cake, candies, and snack foods; staples such as bread, snack noodles, instant noodles, dried noodles, pasta, aseptic-packaged cooked rice, soupy rice, rice gruel, packed rice cake, and cereal foods; processed agricultural products such as pickles, boiled beans, fermented soybeans, miso (soybean paste), frozen bean curd, bean curd, cooked enoki mushrooms, starch of devil's tongue, processed edible wild plants, jams, peanut creams, salads, frozen vegetables, and processed potatoes; processed livestock products such as hams, beacons, sausages, processed chicken products, and corned beefs; processed marine products such as fish hams/sausages, marine paste products, boiled fish pastes, seaweed, foods boiled in soy sauce, dried bonitos, salted fish guts, smoked salmons, and karashimentaiko (food made of salted cod roe with red pepper); fruity fleshes such as peach, orange, pineapple, apple, pear, and cherry; vegetables such as corn, asparagus, mushroom, onion, carrot, Japanese radish, and potato; cooked foods such as frozen household dishes or chilled household dishes typically including hamburgers, meat balls, marine fries, dumplings, croquettes, and the like; milk products such as butter, margarine, cheese, cream, instant creamy powder, and modified milk powder for infant; other foods such as liquid seasonings, retorted curry, and pet foods.

Furthermore, the packaging material of the invention may be used as various packaging materials for non-foods such as tobaccos, disposable body warmers, drugs such as an infusion bag, laundry liquid detergents, dish liquid detergents, bath liquid detergents, bath liquid soaps, liquid shampoo, liquid conditioner, cosmetics such as skin lotion and emulsion, vacuum insulation materials, and batteries.

EXAMPLES

Hereinafter, the invention will be more specifically described with reference to specific Synthetic Examples and Examples; however, the invention is not limited to these Examples. Note that, in the following examples, "part(s)" and "%" each represent "part(s) by mass" and "% by mass" unless otherwise specified.

<Synthesis of Polyol>

Synthetic Example 1

Into a polyester reaction container equipped with a stirrer, a nitrogen gas introduction tube, a snyder tube, and a condenser, 6.4 parts of ethylene glycol, 22.3 parts of neopentyl glycol, 9.9 parts of 1,6-hexanediol, 17.3 parts of isophthalic acid, 21.3 parts of terephthalic acid, 11.9 parts of adipic acid, 0.2 parts of a monomer acid, 6.4 parts of a dimer acid, 1.3 parts of a trimer acid, 0.2 parts of a tetramer acid, and 10 ppm of titanium tetraisopropoxide were charged, heating was performed gradually such that a rectifying tube upper portion temperature did not exceed 100° C., and the internal temperature was held at 260° C. After the acid value was decreased below the prescribed value, the reaction was further continued for 1 hour. The pressure was reduced to 30 mmHg and held for 3 hours to obtain an intermediate polyester polyol having a solid-content acid value of 0.6 mgKOH/g and a hydroxyl value of 10 mgKOH/g. The yield was 85%.

To 100 parts by mass of the obtained intermediate polyester polyol, 3.6 parts by mass of isophorone diisocyanate was added, the mixture was heated to 50 to 90° C., and the urethane formation reaction was performed until the free NCO group was substantially eliminated, thereby obtaining a polyester polyurethane polyol having a hydroxyl value of 10 mgKOH/g. This polyester polyurethane polyol was diluted with ethyl acetate, and dibutyltin dilaurate was added to the polyester polyurethane polyol (solid content) to be in an amount of 200 ppm, thereby obtaining a polyol A-1 having a solid content of the polyester polyurethane polyol of 60%.

Synthetic Example 2

Into a polyester reaction container equipped with a stirrer, a nitrogen gas introduction tube, a snyder tube, and a condenser, 8.2 parts of ethylene glycol, 7.3 parts of diethylene glycol, 4.5 parts of neopentyl glycol, 18.1 parts of 1,6-hexanediol, 9.1 parts of isophthalic acid, 27.2 parts of terephthalic acid, 8.2 parts of adipic acid, 7.3 parts of sebacic acid, 0.2 parts of a monomer acid, 7.4 parts of a dimer acid, 1.3 parts of a trimer acid, 0.2 parts of a tetramer acid, and 10 ppm of titanium tetraisopropoxide were charged, heating was performed gradually such that a rectifying tube upper portion temperature did not exceed 100° C., and the internal temperature was held at 260° C. After the acid value was decreased below the prescribed value, the reaction was further continued for 1 hour. The pressure was reduced to 30 mmHg and held for 3 hours to obtain an intermediate polyester polyol having a solid-content acid value of 0.6 mgKOH/g and a hydroxyl value of 14 mgKOH/g. The yield was 85%.

To 100 parts by mass of the obtained intermediate polyester polyol, 1.4 parts by mass of toluene diisocyanate was added, the mixture was heated to 50 to 90° C., and the urethane formation reaction was performed until the free NCO group was substantially eliminated, thereby obtaining a polyester polyurethane polyol having a hydroxyl value of 14 mgKOH/g. This polyester polyurethane polyol was diluted with ethyl acetate, and dibutyltin dilaurate was added to the polyester polyurethane polyol (solid content) to be in an amount of 200 ppm, thereby obtaining a polyol A-2 having a solid content of the polyester polyurethane polyol of 60%.

Synthetic Example 3

Into a polyester reaction container equipped with a stirrer, a nitrogen gas introduction tube, a snyder tube, and a condenser, 13.2 parts of ethylene glycol, 17.5 parts of 1,6-hexanediol, 8.8 parts of isophthalic acid, 21.9 parts of terephthalic acid, 7.0 parts of adipic acid, 7.0 parts of sebacic acid, 0.6 parts of a monomer acid, 18.4 parts of a dimer acid, 3.6 parts of a trimer acid, 0.6 parts of a tetramer acid, and 10 ppm of titanium tetraisopropoxide were charged, heating was performed gradually such that a rectifying tube upper portion temperature did not exceed 100° C., and the internal temperature was held at 260° C. After the acid value was decreased below the prescribed value, the reaction was further continued for 1 hour. The pressure was reduced to 30 mmHg and held for 3 hours to obtain an intermediate polyester polyol having a solid-content acid value of 0.7 mgKOH/g and a hydroxyl value of 12 mgKOH/g. The yield was 84%.

To 100 parts by mass of the obtained intermediate polyester polyol, 2.1 parts by mass of hexamethylene diisocyanate was added, the mixture was heated to 50 to 90° C., and the urethane formation reaction was performed until the free NCO group was substantially eliminated, thereby obtaining a polyester polyurethane polyol having a hydroxyl value of 12 mgKOH/g. This polyester polyurethane polyol was diluted with ethyl acetate, and dibutyltin dilaurate was added to the polyester polyurethane polyol (solid content) to be in an amount of 200 ppm, thereby obtaining a polyol A-3 having a solid content of the polyester polyurethane polyol of 60%.

Synthetic Example 4

Into a polyester reaction container equipped with a stirrer, a nitrogen gas introduction tube, a snyder tube, and a condenser, 10.6 parts of ethylene glycol, 6.4 parts of 2-methyl-1,3-propanediol, 15.9 parts of 1,6-hexanediol, 10.6 parts of isophthalic acid, 21.2 parts of terephthalic acid, 8.5 parts of adipic acid, 4.2 parts of azelaic acid, 0.6 parts of a monomer acid, 17.5 parts of a dimer acid, 3.3 parts of a trimer acid, 0.6 parts of a tetramer acid, and 10 ppm of titanium tetraisopropoxide were charged, heating was performed gradually such that a rectifying tube upper portion temperature did not exceed 100° C., and the internal temperature was held at 260° C. After the acid value was decreased below the prescribed value, the reaction was further continued for 1 hour. The pressure was reduced to 20 mmHg and held for 3 hours to obtain an intermediate polyester polyol having a solid-content acid value of 0.7 mgKOH/g and a hydroxyl value of 13 mgKOH/g. The yield was 84%.

To 100 parts by mass of the obtained intermediate polyester polyol, 0.9 parts by mass of 4,4'-diphenylmethane diisocyanate was added, the mixture was heated to 50 to 90° C., and the urethane formation reaction was performed until the free NCO group was substantially eliminated, thereby obtaining a polyester polyurethane polyol having a hydroxyl value of 13 mgKOH/g. This polyester polyurethane polyol was diluted with ethyl acetate, and dibutyltin dilaurate was added to the polyester polyurethane polyol (solid content) to be in an amount of 200 ppm, thereby obtaining a polyol A-4 having a solid content of the polyester polyurethane polyol of 60%.

Synthetic Example 5

Into a polyester reaction container equipped with a stirrer, a nitrogen gas introduction tube, a snyder tube, and a condenser, 14.7 parts of ethylene glycol, 5.9 parts of 2-methyl-1,3-propanediol, 14.7 parts of 1,6-hexanediol, 29.4 parts of isophthalic acid, 17.6 parts of adipic acid, 0.4 parts of a monomer acid, 13.8 parts of a dimer acid, 2.9 parts of a trimer acid, 0.5 parts of a tetramer acid, and 10 ppm of titanium tetraisopropoxide were charged, heating was performed gradually such that a rectifying tube upper portion temperature did not exceed 100° C., and the internal temperature was held at 260° C. After the acid value was decreased below the prescribed value, the reaction was further continued for 1 hour. The pressure was reduced to 30 mmHg and held for 3 hours to obtain a polyester polyol having a solid-content acid value of 0.8 mgKOH/g and a hydroxyl value of 20 mgKOH/g. The yield was 85%. This polyester polyol was diluted with ethyl acetate, and dibutyltin dilaurate was added to the polyester polyol (solid content) to be in an amount of 200 ppm, thereby obtaining a polyol A-5 having a solid content of the polyester polyol of 60%.

Synthetic Example 6

Into a polyester reaction container equipped with a stirrer, a nitrogen gas introduction tube, a snyder tube, and a condenser, 13.9 parts of ethylene glycol, 23.2 parts of 1,6-hexanediol, 38.6 parts of isophthalic acid, 18.6 parts of azelaic acid, 0.1 parts of a dimer acid, 4.2 parts of a trimer acid, 1.1 parts of a tetramer acid, and 10 ppm of titanium tetraisopropoxide were charged, heating was performed gradually such that a rectifying tube upper portion temperature did not exceed 100° C., and the internal temperature was held at 260° C. After the acid value was decreased below the prescribed value, the reaction was further continued for 1 hour. The pressure was reduced to 30 mmHg and held for 3 hours to obtain a polyester polyol having a solid-content acid value of 0.8 mgKOH/g and a hydroxyl value of 24 mgKOH/g. The yield was 85%.

To 100 parts by mass of the obtained intermediate polyester polyol, 0.3 parts by mass of toluene diisocyanate was added, the mixture was heated to 50 to 90° C., and the urethane formation reaction was performed until the free NCO group was substantially eliminated, thereby obtaining a polyester polyurethane polyol having a hydroxyl value of 24 mgKOH/g. This polyester polyurethane polyol was diluted with ethyl acetate, and dibutyltin dilaurate was added to the polyester polyurethane polyol (solid content) to be in an amount of 200 ppm, thereby obtaining a polyol A-6 having a solid content of the polyester polyurethane polyol of 50%.

Synthetic Example 7

Into a polyester reaction container equipped with a stirrer, a nitrogen gas introduction tube, a snyder tube, and a condenser, 12.2 parts of ethylene glycol, 15.2 parts of neopentyl glycol, 10.1 parts of 1,6-hexanediol, 16.2 parts of isophthalic acid, 21.8 parts of terephthalic acid, 24.4 parts of adipic acid, and 10 ppm of titanium tetraisopropoxide were charged, heating was performed gradually such that a rectifying tube upper portion temperature did not exceed 100° C., and the internal temperature was held at 260° C. After the acid value was decreased below the prescribed value, the reaction was further continued for 1 hour. The pressure was reduced to 30 mmHg and held for 3 hours to obtain a polyester polyol having a solid-content acid value of 0.6 mgKOH/g and a hydroxyl value of 10 mgKOH/g. The yield was 86%. This polyester polyol was diluted with ethyl acetate, and dibutyltin dilaurate was added to the polyester polyol (solid content) to be in an amount of 200 ppm, thereby obtaining a polyol AH-1 having a solid content of the polyester polyol of 60%.

Synthetic Example 8

Into a polyester reaction container equipped with a stirrer, a nitrogen gas introduction tube, a snyder tube, and a condenser, 10.3 parts of ethylene glycol, 3.6 parts of diethylene glycol, 25.8 parts of 1,6-hexanediol, 20.7 parts of isophthalic acid, 15.0 parts of terephthalic acid, 15.0 parts of adipic acid, 7.7 parts of sebacic acid, and 10 ppm of titanium tetraisopropoxide were charged, heating was performed gradually such that a rectifying tube upper portion temperature did not exceed 100° C., and the internal temperature was held at 260° C. After the acid value was decreased below the prescribed value, the reaction was further continued for 1 hour. The pressure was reduced to 30 mmHg and held for 3 hours to obtain a polyester polyol having a solid-content acid value of 0.8 mgKOH/g and a hydroxyl value of 20 mgKOH/g. The yield was 86%.

To 100 parts by mass of the obtained intermediate polyester polyol, 1.5 parts by mass of toluene diisocyanate was added, the mixture was heated to 50 to 90° C., and the urethane formation reaction was performed until the free NCO group was substantially eliminated, thereby obtaining a polyester polyurethane polyol having a hydroxyl value of 19 mgKOH/g. This polyester polyurethane polyol was diluted with ethyl acetate, and dibutyltin dilaurate was added to the polyester polyurethane polyol (solid content) to be in an amount of 200 ppm, thereby obtaining a polyol AH-2 having a solid content of the polyester polyurethane polyol of 60%.

The solid-content hydroxyl value of each polyol and the blending amount (% by mass) of the tetramer acid in the monomer composition used in synthesis of the polyester polyol are shown in Tables 1 and 2.

TABLE 1

|  | A-1 | A-2 | A-3 | A-4 | A-5 |
|---|---|---|---|---|---|
| Hydroxyl value (mgKOH/g) | 10 | 14 | 12 | 13 | 20 |
| Tetramer acid blending amount (% by mass) | 0.23 | 0.22 | 0.62 | 0.57 | 0.52 |

TABLE 2

|  | A-6 | AH-1 | AH-2 |
|---|---|---|---|
| Hydroxyl value (mgKOH/g) | 24 | 10 | 19 |
| Tetramer acid blending amount (% by mass) | 1.14 | 0 | 0 |

<Preparation of Adhesive>

Example 1

The polyol A-1 and a polyisocyanate B-1 (manufactured by Mitsui Chemicals, Inc., TAKENATE D-110N (NB), trimethylolpropane adduct form of xylylene diisocyanate, non-volatile content: 75%) were used at blending ratios shown in Table 3 to prepare an adhesive of Example 1.

(Example 2) to (Example 6)

Adhesives of Example 2 to Example 6 were prepared in the same manner as in Example 1, except that the polyol and isocyanate to be used and the blending ratios thereof were changed as shown in Tables 3 and 4. Note that, a polyisocyanate B-2 in the table is Desmodur L75 manufactured by Covestro AG that is a trimethylolpropane adduct form of toluene diisocyanate and has a non-volatile content of 75%.

(Comparative Example 1) and (Comparative Example 2)

Adhesives of Comparative Examples 1 and 2 were prepared in the same manner as in Example 1, except that the polyol and isocyanate to be used and the blending ratios thereof were changed as shown in Table 4.

Note that, the blending amount in the table is a value including a solvent. KBM-403 is 3-glycidoxypropyltrimethoxysilane (Shin-Etsu Chemical Co., Ltd.).

<Production of Laminate>
(Production of Laminate 1)

Each of the adhesives of Examples and Comparative Examples was applied to a PET film having a thickness of 25 μm using a bar coater to have a coating amount of 3.5 g/m² (solid content) and dried by volatilizing ethyl acetate with a dryer set at a temperature of 70 degrees. Next, the adhesive was bonded to an aluminum foil having a thickness of 30 μm. The aging was performed at 40° C. for 3 days to obtain a laminate 1.
(Production of Laminate 2)

Each of the adhesives of Examples and Comparative Examples was applied to a PET film having a thickness of 12 μm using a bar coater to have a coating amount of 3.5 g/m² (solid content) and dried by volatilizing ethyl acetate with a dryer. Next, the adhesive was bonded to a stretched nylon film having a thickness of 15 μm.

Subsequently, each of the adhesives of Examples or Comparative Examples was applied to the nylon surface of the laminate to have a coating amount of 3.5 g/m² (solid content) and dried by volatilizing ethyl acetate with a dryer set at a temperature of 70 degrees. The adhesive was bonded to an aluminum foil having a thickness of 9 μm.

Subsequently, each of the adhesives of Examples or Comparative Examples was applied to the aluminum foil surface of the laminate to have a coating amount of 3.5 g/m² (solid content) and dried by volatilizing ethyl acetate with a dryer set at a temperature of 70 degrees. The adhesive was bonded to a CPP film having a thickness of 70 μm. The aging was performed at 40° C. for 3 days to obtain a laminate 2.
(Production of Laminate 3)

Each of the adhesives of Examples and Comparative Examples was applied to a PET film having a thickness of 12 μm using a bar coater to have a coating amount of 3.5 g/m² (solid content) and dried by volatilizing ethyl acetate with a dryer set at a temperature of 70 degrees. Next, the adhesive was bonded to an aluminum foil having a thickness of 9 μm.

Subsequently, each of the adhesives of Examples or Comparative Examples was applied to the aluminum foil surface of the laminate to have a coating amount of 3.5 g/m² (solid content) and dried by volatilizing ethyl acetate with a dryer set at a temperature of 70 degrees, and the adhesive was bonded to an LLDPE film having a thickness of 60 μm. The aging was performed at 40° C. for 3 days to obtain a laminate 3.
<Evaluation>
(Normal Adhesion Force)

The adhesive strength (N/15 mm) between the PET film and aluminum of the laminate 1 was measured using a tensile tester under an atmosphere of 25° C. by a T-type peeling method while the peeling rate was set to 300 mm/min. The results were collectively shown in Tables 3 and 4.
(Hot Adhesion Force)

The adhesive strength (N/15 mm) between the PET film and aluminum of the laminate 1 was measured using a tensile tester under an atmosphere of 100° C. at a free measurement angle while the peeling rate was set to 3 mm/min. The results were collectively shown in Tables 3 and 4.
(Retorting Resistance)

A test specimen was cut from the laminate 2 and folded such that the CPP film faced inwardly, and three sides other than the top of the fold was heat-sealed at a width of 10 mm. Next, a 1.5-mm cut (notch) was formed at an arbitrary place of the heat-sealed edge to produce a test piece. 20 test pieces produced in the same manner were placed such that the notch of each test piece was positioned near a hot water shower nozzle of a shower type retort sterilizer (manufactured by HISAKA WORKS, LTD., Flavor Ace) and subjected to a retort treatment under the conditions of 135° C. and 30 minutes. The state of each test piece after retorting was evaluated as described below, and the results thereof were collectively shown in Tables 3 and 4.

5: The number of peelings having a length of the major axis of 3 mm or less was less than 3.

4: The number of peelings having a length of the major axis of 3 mm or less was 3 or more and less than 5.

3: The number of peelings having a length of the major axis of 3 mm or less was 5 or more and less than 10.

2: The number of peelings having a length of the major axis of 3 mm or less was 10 or more, or the number of peelings having a length of the major axis of more than 3 mm was less than 5.

1: The number of peelings having a length of the major axis of more than 3 mm was or more.

(Content Resistance)

The laminate 3 was used and folded such that the LLDPE film faced inwardly, thereby producing a pouch so as to have a contact area with the content after heat-sealing of 200 cm$^2$. 20 ml of d-limonene (manufactured by Tokyo Chemical Industry Co., Ltd.) was filled in the pouch, and the pouch was heat-sealed to be hermetically sealed and was left to stand still at 40° C. for 1 week. The state between the aluminum foil and the LLDPE film of the pouch returned to room temperature was evaluated as described below, and the results thereof were collectively shown in Tables 3 and 4.

5: There was no peeling.

4: The peeling of less than 10 mm (long side) was observed only near the top of the fold.

3: The peeling of 10 mm or more (long side) was observed only near the top of the fold.

2: The peeling was observed to the degree of approximately half of the pouch.

1: The peeling was observed on the entire pouch.

TABLE 3

|  | Example 1 | Example 2 | Example 3 | Example 4 | Example 5 |
|---|---|---|---|---|---|
| Polyol A-1 | 12 | | | | |
| Polyol A-2 | | 10 | | | |
| Polyol A-3 | | | 12 | | |
| Polyol A-4 | | | | 10 | |
| Polyol A-5 | | | | | 7 |
| Polyisocyanate B-1 | 1 | | | | 1 |
| Polyisocyanate B-2 | | 1 | 1 | 1 | |
| NCO/OH | 2.1 | 2.2 | 2.1 | 2.3 | 1.8 |
| Evaluation result | | | | | |
| Heat resistance  Normal adhesive strength | 4.2 | 4.3 | 4.5 | 4.5 | 4.1 |
| Heat resistance  Hot adhesive strength | 2.8 | 3.2 | 3.3 | 3.2 | 2.4 |
| Retorting resistance | 4 | 4 | 5 | 4 | 4 |
| Content resistance | 3 | 4 | 4 | 4 | 3 |

TABLE 4

|  | Example 6 | Example 7 | Comparative Example 1 | Comparative Example 2 |
|---|---|---|---|---|
| Polyol A-5 | 7 | | | |
| Polyol A-6 | | 9 | | |
| Polyol AH-1 | | | 12 | |
| Polyol AH-2 | | | | 12 |
| Polyisocyanate B-1 | 1 | | 1 | |
| Polyisocyanate B-2 | | 1 | | 1 |
| KBM-403 | 0.042 | | | |
| NCO/OH | 1.8 | 1.7 | 2.5 | 2.5 |
| Evaluation result | | | | |
| Heat resistance  Normal adhesive strength | 4.2 | 4.5 | 3.8 | 4.3 |
| Heat resistance  Hot adhesive strength | 2.9 | 3.5 | 1.9 | 2.1 |
| Retorting resistance | 4 | 5 | 1 | 2 |
| Content resistance | 3 | 5 | 1 | 1 |

As clearly shown from Tables 3 and 4, the adhesive of the invention was excellent in normal adhesive strength, hot adhesive strength, retorting resistance, and content resistance. On the other hand, the adhesives of Comparative Examples were inferior to the adhesives of Examples in retorting resistance and content resistance.

The invention claimed is:

1. An adhesive comprising:
a polyol composition (A) including a polyester polyol (A1); and
a polyisocyanate composition (B) including a polyisocyanate compound (B1), wherein
the polyester polyol (A1) is a reaction product of a composition including a polycarboxylic acid, a polyhydric alcohol and an isocyanate compound, the polycarboxylic acid includes a tetramer acid, and the adhesive is a two-component curable adhesive.

2. The adhesive according to claim 1, wherein a blending amount of the tetramer acid in the composition is 0.1% by mass or more and 4.0% by mass or less.

3. The adhesive according to claim 1, wherein the composition includes a compound (b) having a shortest methylene chain having 6 or more and 20 or less carbon atoms between functional groups.

4. The adhesive according to claim 3, wherein a blending amount of the compound (b) in the composition is 0.1% by mass to 35% by mass.

5. The adhesive according to claim 1, wherein the composition includes at least one selected from pyromellitic acid, pyromellitic anhydride, sorbitol, pentaerythritol, and dipentaerythritol.

6. A laminate comprising:
a first base material;
a second base material; and
an adhesive layer bonding the first base material and the second base material, wherein
the adhesive layer is a cured product of the adhesive according to claim 1.

7. The laminate according to claim 6, wherein the first base material is formed from aluminum and the second base material is formed from nylon.

8. The laminate according to claim 6, wherein the first base material is a barrier layer.

9. A packaging material comprising the laminate according to claim 6.

10. A retort packaging material comprising the laminate according to claim 7.

11. A non-food packaging material comprising the laminate according to claim 8.

* * * * *